(12) United States Patent  (10) Patent No.: US 8,428,347 B2
Sasaki  (45) Date of Patent: Apr. 23, 2013

(54) COLOR PROCESSING APPARATUS, COLOR PROCESSING METHOD, AND NON-TRANSITORY COMPUTER READABLE MEDIUM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 27 days.

(21) Appl. No.: 13/238,884

(22) Filed: Sep. 21, 2011

(65) Prior Publication Data

US 2012/0207385 A1 Aug. 16, 2012

(30) Foreign Application Priority Data

Feb. 10, 2011 (JP) .................................. 2011-027350

(51) Int. Cl.
*G06K 9/00* (2006.01)
*G06K 9/36* (2006.01)

(52) U.S. Cl.
USPC .......................................... 382/162; 382/276

(58) Field of Classification Search .................. 382/162, 382/167, 276
See application file for complete search history.

(56) References Cited

U.S. PATENT DOCUMENTS 6,636,628 B1 * 10/2003 Wang et al. .................... 382/167
2008/0062330 A1 * 3/2008 Sasaki ........................... 348/708

FOREIGN PATENT DOCUMENTS

| JP | A-9-9086 | 1/1997 |
|---|---|---|
| JP | A-10-262157 | 9/1998 |
| JP | A-2002-84434 | 3/2002 |
| JP | B2-3470937 | 11/2003 |

OTHER PUBLICATIONS

Mestha, L.K.—"Iteratively clustered interpolation (ICI) algorithm for geometrical interpolation of an irregularly spaced multidimensional color space"—2000, pp. 1-4.*
Bala, R.—"Inverse problems in color device characterization"—SPIE 2003, vol. 5016, pp. 185-195.*

* cited by examiner

*Primary Examiner* — Bernard Krasnic
(74) *Attorney, Agent, or Firm* — Oliff & Berridge, PLC

(57) ABSTRACT

A color processing apparatus includes a first calculation unit, a determination unit, and a second calculation unit. The first calculation unit calculates a second color signal from a first color signal by using successive approximation. The first color signal is given by repeatedly calculating a first successive solution using an inverse matrix of a sensitivity matrix of an input/output characteristic function of an output device. The determination unit determines whether or not the first successive solution calculated by the first calculation unit is divergent. The second calculation unit calculates a second successive solution using a method different from a method used by the first calculation unit when the determination unit determines that the first successive solution is divergent.

6 Claims, 5 Drawing Sheets

US 8,428,347 B2

COLOR PROCESSING APPARATUS, COLOR PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-027350 filed Feb. 10, 2011.

BACKGROUND (i) Technical Field

The present invention relates to a color processing apparatus, a color processing method, and a non-transitory computer readable medium.

(ii) Related Art

Input/output characteristics of an output device are obtained from a pair of color signals, namely, a color signal given to the output device and a color signal produced by measuring the color output from the output device in response to the color signal given to the output device. For example, CMY color signals or CMYK color signals are given to an image forming device that forms an image using colorants of cyan (C), magenta (M), and yellow (Y) or using cyan (C), magenta (M), yellow (Y), and black (K), and the colors of an image formed by the image forming device are measured to obtain L*a*b* color signals. The input/output characteristics from the CMY color signals or CMYK color signals to the L*a*b* color signals are obtained from the pairs of CMY color signals or CMYK color signals and L*a*b* color signals. Further, input/output characteristics of a display device are obtained as follows. Red/green/blue (RGB) color signals are given to the display device, and the colors displayed on the display device are measured to obtain L*a*b* color signals. Thus, the input/output characteristics from the RGB color signals to the L*a*b* color signals are obtained from the pairs of RGB color signals and L*a*b* color signals.

With the use of an inverse function of a function representing the above input/output characteristics, for example, CMY color signals or CMYK color signals, RGB color signals, or the like are obtained from given L*a*b* color signals. In computer color matching (CCM) known in the field of color engineering, inverse functions are solved using Newton's method.

In Newton's method, if a color signal given to an output device is represented by an input color signal and a signal of a color (for example, a color signal produced by measuring a color) output from the output device is represented by an output color signal, an appropriate initial value is given to the input color signal with respect to the given output color signal, and the input color signal is corrected on the basis of the sensitivity of the function representing the input/output characteristics of the output device, resulting in convergence. Using this principle, the input color signal is calculated from the output color signal, that is, the inverse function of the function representing the input/output characteristics is solved.

Here, an update value for the input color signal is calculated to correct the input color signal. The update value is calculated using the inverse matrix of the sensitivity matrix (Jacobian matrix). Since the inverse matrix of the sensitivity matrix is used, the solution is divergent if the sensitivity matrix is irregular. If the solution is divergent, the input color signal is not calculated because of no convergence. Therefore, it is desirable to prevent the solution from being divergent.

SUMMARY

According to an aspect of the invention, there is provided a color processing apparatus including a first calculation unit, a determination unit, and a second calculation unit. The first calculation unit calculates a second color signal from a first color signal by using successive approximation. The first color signal is given by repeatedly calculating a first successive solution using an inverse matrix of a sensitivity matrix of an input/output characteristic function of an output device. The determination unit determines whether or not the first successive solution calculated by the first calculation unit is divergent. The second calculation unit calculates a second successive solution using a method different from a method used by the first calculation unit when the determination unit determines that the first successive solution is divergent.

BRIEF DESCRIPTION OF THE DRAWINGS

Exemplary embodiments of the present invention will be described in detail based on the following figures, wherein.

DETAILED DESCRIPTION

Figure 1:
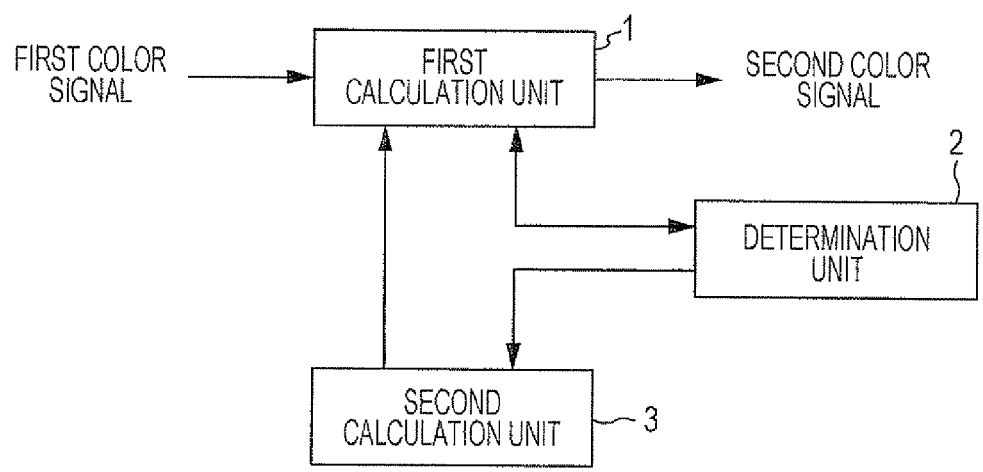
FIG. 1 is a schematic diagram illustrating an exemplary embodiment of the present invention.

FIG. 1 is a schematic diagram illustrating an exemplary embodiment of the present invention. In FIG. 1, a first calculation unit 1, a determination unit 2, and a second calculation unit 3 are illustrated. Here, it is assumed that a color signal given to a desired output device is represented by a second color signal and that a color signal produced by measuring a color output by giving the second color signal to the desired output device is represented by a first color signal. An input/output characteristic function that is a function representing the input/output characteristics of the output device may be obtained from plural pairs of second color signals and first color signals.

The first calculation unit 1 iteratively calculates first successive solutions using the inverse matrix of the sensitivity matrix of the input/output characteristic function of the output device to calculate second color signals from given first color signals through using successive approximation. The calculation of second color signals may be performed using any method such as Newton's method in which successive computation is performed using the inverse matrix of the sensitivity matrix of the input/output characteristic function.

The determination unit 2 determines whether or not a first successive solution calculated by the first calculation unit 1 is divergent. The determination may be performed by determining whether or not the value of the determinant of the sensitivity matrix is within a preset range, by determining whether or not the difference between a first successive solution calculated by the first calculation unit 1 and a color signal representing the boundary of the color gamut reproduced by the output device is within a preset range, or by using any other known method.

When the determination unit 2 determines that the first successive solution is divergent, the second calculation unit 3 calculates a second successive solution by using a method different from that used by the first calculation unit 1. Examples of the calculation method include a method that does not use the inverse matrix of the sensitivity matrix, and a method that uses the inverse matrix of the sensitivity matrix, in which the inverse matrix is changed so that the successive solution is not divergent. Some specific examples of the calculation method will be described below. When the second calculation unit 3 calculates a second successive solution, the process of the first calculation unit 1 is continued with the calculated second successive solution replacing the first successive solution in the current iteration of the first calculation unit 1.

Figure 2:
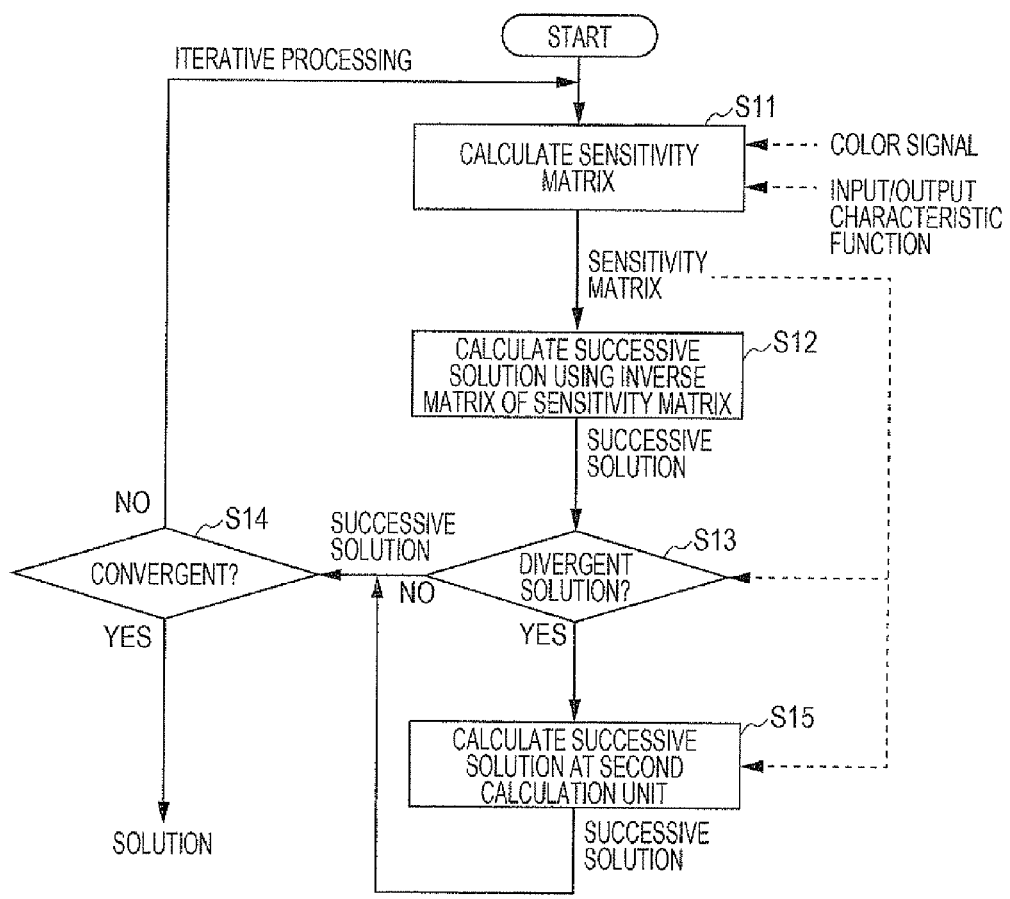
FIG. 2 is a flow diagram illustrating an example of the operation according to the exemplary embodiment of the present invention.

FIG. 2 is a flow diagram illustrating an example of the operation according to the exemplary embodiment of the present invention. In S11, the first calculation unit 1 calculates a sensitivity matrix of an input/output characteristic function in a given color signal, or in a first successive solution in iteration of computation. Then, in S12, the first calculation unit 1 calculates a first successive solution from the inverse matrix of the sensitivity matrix.

In S13, the determination unit 2 determines whether or not the first successive solution calculated in S12 is divergent. If it is determined that the first successive solution is not divergent, the first calculation unit 1 is instructed to continue the process. In S14, the first calculation unit 1 determines whether or not the iterative computation has converged. If the iterative computation has not converged, the first calculation unit 1 returns to S11 and continues the process. If the iterative computation has converged, the first calculation unit 1 outputs the current successive solution as a computation result.

If it is determined in S13 that the successive solution is divergent, in S15, the second calculation unit 3 calculates second successive solutions using a method different from that used by the first calculation unit 1. The calculated second successive solution is used as the first successive solution in the current iteration of the first calculation unit 1, and convergence determination in S14 is performed. If the iterative computation has not converged, the process returns to S11. If the iterative computation has converged, the obtained successive solution is used as a computation result.

Figure 3:
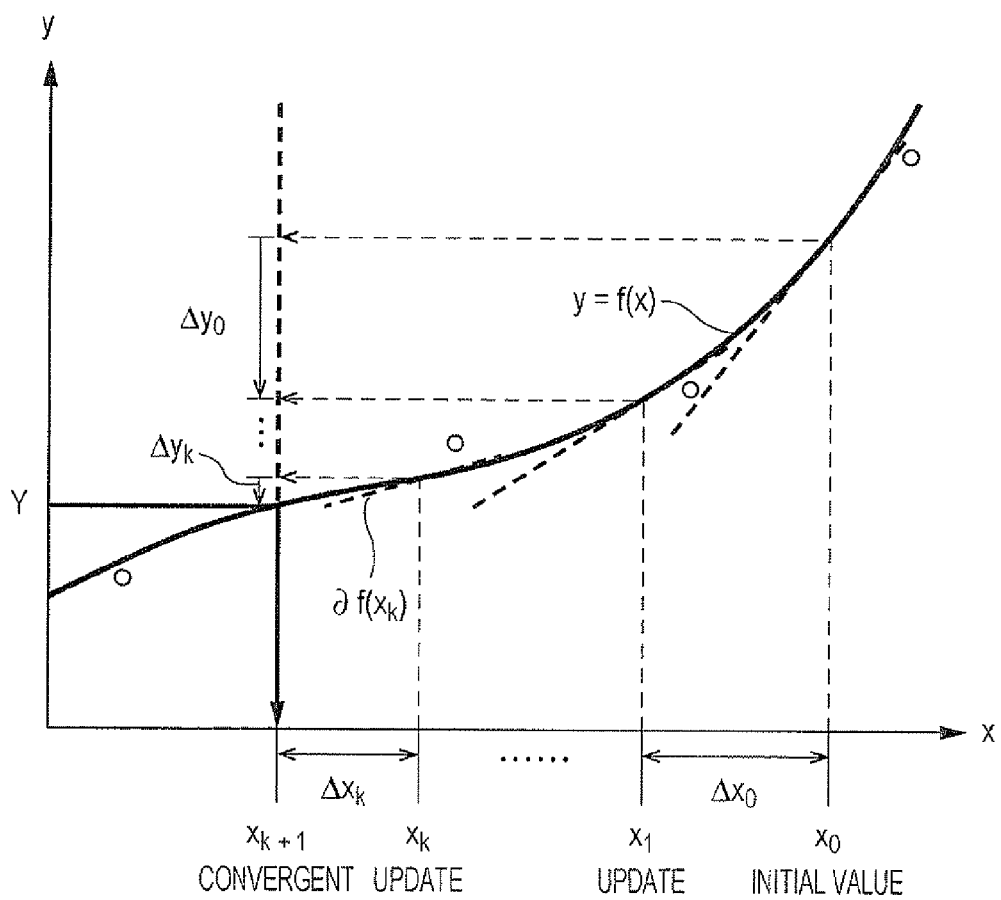
FIG. 3 illustrates an example of update of successive solutions using Newton's method.

The above configuration will be described in more detail. By way of example, the calculation performed by the first calculation unit 1 using Newton's method will be described. FIG. 3 illustrates an example of update of successive solutions using Newton's method. In general, when the solution of F(x)=0 is determined using Newton's method, initial value $x=x_0$ is given, and x is updated by iterative computation so that x satisfying the convergence condition is used as a computation result. The calculation of $F(x_0+\Delta x)=0$ is performed using a Taylor expansion at $x=x_0$, which becomes $$F(x_0+\Delta x)=F(x_0)+\partial F(x_0)\Delta x.$$

Then, $$\Delta x=-\partial F(x_0)^{-1}F(x_0)$$

is obtained, and thus a solution $x_1$ newer than the initial value is given by $$x_1=x_0+\Delta x=x_0-\partial F(x_0)^{-1}F(x_0).$$

Using a generalization in which the successive solution updated in the k-th iteration is represented by $x_k$, the successive solution is updated according to $$x_{k+1}=x_k+\Delta x=x_k-\partial F(x_k)^{-1}F(x_k).$$

The above formula is modified into $$F(x_k)=-\partial F(x_k)(x_{k+1}-x_k),$$

and, assuming that F(x)=Y−f(x), the following formula $$Y-f(x_k)=\partial f(x_k)(x_{k+1}-x_k)$$

is obtained from $\partial F(x_k)=-\partial f(x_k)$. The above formula represents the tangent of the function f at $x_k$, and $\partial f(x_k)$ represents the slope. In FIG. 3, in the function y=f(x), X is determined when Y is given, where $\Delta x_k$ is given by $x_{k+1}-x_k$ and $\Delta y_k$ is given by $f(x_{k+1})-f(x_k)$.

The slope of the tangent, $\partial f(x_k)$, is an n×n matrix, which is referred to as the sensitivity matrix. If $x_k=(x_{k1}, x_{k2}, \ldots, x_{kn})$ and $y_k=(y_{k1}, y_{k2}, \ldots, y_{kn})$, $\partial f(x_k)$ is given by the following expression:

$$\partial f(x_k) = \begin{pmatrix} \frac{\partial y_{k1}}{\partial x_{k1}} & \frac{\partial y_{k1}}{\partial x_{k2}} & \cdots & \frac{\partial y_{k1}}{\partial x_{kn}} \\ \frac{\partial y_{k2}}{\partial x_{k1}} & \frac{\partial y_{k2}}{\partial x_{k2}} & \cdots & \frac{\partial y_{k2}}{\partial x_{kn}} \\ \vdots & \vdots & \ddots & \vdots \\ \frac{\partial y_{kn}}{\partial x_{k1}} & \frac{\partial y_{kn}}{\partial x_{k2}} & \cdots & \frac{\partial y_{kn}}{\partial x_{kn}} \end{pmatrix}$$

The sensitivity matrix $\partial f(x_k)$ is calculated in S11 in FIG. 2.

The matrix $\partial F(x_k)^{-1}$, which is used to calculate the successive solution $x_{k+1}$, is the inverse of the sensitivity matrix. Using the inverse matrix of the sensitivity matrix, $$\Delta x_k=\partial f(x_k)^{-1}\Delta y_k$$

may be calculated to determine the successive solution $x_{k+1}$ using $x_{k+1}=x_k+\Delta x_k$. This processing is performed in S12 in FIG. 2.

The determination unit 2 determines whether or not the obtained first successive solution is divergent. Since the sensitivity matrix represents the slope of the tangent, $\Delta x$ increases as the slope decreases. Due to this relationship, $\Delta x$ may be divergent depending on the sensitivity matrix. The determination unit 2 determines whether or not $\Delta x$ is divergent by, for example, determining whether or not the value of the determinant of the sensitivity matrix is within a preset range. For example, the lower limit of the value of the determinant may be set in advance, and it may be determined that $\Delta x$ is divergent if the value of the determinant is below the lower limit. Alternatively, it may be determined whether or not the successive solution is within a preset range. The preset range may be set by setting the upper limit and lower limit of the successive solution, and it may be determined that $\Delta x$ is divergent if the successive solution exceeds the upper limit or is below the lower limit. The above determination is performed by the determination unit 2 in S13 in FIG. 2.

If it is determined that the successive solution $x_k$ is not divergent, then in S14 in FIG. 2, the first calculation unit 1 performs convergence determination. The convergence determination may be performed by determining whether or not the value given by $Y-f(x_k)$ is less than or equal to a preset value. If it is determined that convergence has occurred, the successive solution $x_k$ may be used as an obtained solution. If it is determined that convergence has not occurred, computation is repeatedly performed to determine next $x_{k+1}$ from $x_k$.

If the determination unit 2 determines that the first successive solution is divergent, the second calculation unit 3 calculates a second successive solution. A first example of the calculation method used by the second calculation unit 3 is to calculate the second successive solution that minimizes a linear equation which uses the sensitivity matrix. In the calculation method used by the first calculation unit 1 described above, $\Delta x_k$ is determined using $\Delta x_k = \partial f(x_k)^{-1} \Delta y_k$. In this example, in contrast, the following equation $$\Delta y_k = \partial f(x_k) \Delta x_k$$

is used, and is expanded as follows:

$$\left.\begin{aligned}\Delta y_{k1} &= \frac{\partial y_{k1}}{\partial x_{k1}}\Delta x_{k1} + \frac{\partial y_{k1}}{\partial x_{k2}}\Delta x_{k2} + \ldots + \frac{\partial y_{k1}}{\partial x_{kn}}\Delta x_{kn} \\ \Delta y_{k2} &= \frac{\partial y_{k2}}{\partial x_{k1}}\Delta x_{k1} + \frac{\partial y_{k2}}{\partial x_{k2}}\Delta x_{k2} + \ldots + \frac{\partial y_{k2}}{\partial x_{kn}}\Delta x_{kn} \\ &\vdots \\ \Delta y_{kn} &= \frac{\partial y_{kn}}{\partial x_{k1}}\Delta x_{k1} + \frac{\partial y_{kn}}{\partial x_{k2}}\Delta x_{k2} + \ldots + \frac{\partial y_{kn}}{\partial x_{kn}}\Delta x_{kn}\end{aligned}\right\} \quad (1)$$

The cost function E that minimizes the above linear equations is given by $$E = \sum_i \left(\Delta y_{ki} - \left(\frac{\partial y_{ki}}{\partial x_{k1}}\Delta x_{k1} + \frac{\partial y_{ki}}{\partial x_{k2}}\Delta x_{k2} + \ldots + \frac{\partial y_{ki}}{\partial x_{kn}}\Delta x_{kn}\right)\right)^2 \quad (2)$$

and n minimization equations, the number of which corresponds to the number of is in $\partial E/\partial \Delta x_{kj}$, may be solved for the cost function to numerically and analytically calculate $\Delta x_{kj}$. In this method, no successive solutions are divergent because the inverse matrix of the sensitivity matrix is not used. However, the process of the second calculation unit 3 may require more time for computation than the process of the first calculation unit 1.

A second example of the calculation method used by the second calculation unit 3 is to use the Levenberg-Marquardt method. For example, if the formula described above, i.e., $\Delta y_k = \partial f(x_k)\Delta x_k$, is analytically solved using the following expression (Gaussian-Newton's method):

$$\partial f(x_k)^T \Delta y_k = \partial f(x_k)^T \partial f(x_k) \Delta x_k,$$

the inverse matrix of $\partial f(x_k)^T \partial f(x_k)$ may be required to calculate $\Delta x_k$. Here, to ensure the safety of $\partial f(x_k)^T \partial f(x_k)$, an identity matrix I and a regularization parameter $\mu (\mu > 0)$ are further used, resulting in $$\partial f(x_k)^T \Delta y_k = (\partial f(x_k)^T \partial f(x_k) + \mu I)\Delta x_k.$$

Since $\partial f(x_k)^T \partial f(x_k) + \mu I$ yields a positive-definite matrix, a solution with the safe inverse matrix which will converge may be calculated.

The second example of the calculation method used by the second calculation unit 3 will be further described below with respect to a specific example.

The second successive solution determined by the second calculation unit 3 is passed to the first calculation unit 1, and the convergence determination described above is performed with the passed successive solution replacing the first successive solution determined by the first calculation unit 1. If it is determined that convergence has occurred, the successive solution may be used as an obtained solution. If it is determined that convergence has not occurred, the iterative process of the first calculation unit 1 is performed from the successive solution. It is to be understood that if the successive solution is divergent in the iterative process, the second calculation unit 3 determines a successive solution.

Here, the above process will be described with respect to a specific example. For example, it is assumed that the output device receives a second color signal based on the CMYK representation, and a first color signal obtained by measuring the colors output from the output device is based on the L*a*b* representation. Here, if the second color signal is represented by $x = (C, M, Y, K)^T$ and the first color signal is represented by $y = (L^*, a^*, b^*)^T$, the input/output characteristic function f of the output device is represented by $y = f(x)$. The input/output characteristic function f of the output device may be obtained from plural pairs of first and second color signals, that is, CMYK second color signals and corresponding L*a*b* first color signals obtained by actually supplying the second color signals to the output device and measuring the colors from the output device, using Neugebauer's method or a statistical method based on a regression model, learning based on a neural network, or the like. Then, a second color signal is calculated by giving a first color signal.

In this example, the number of dimensions of the second color signal x that represents an unknown number is four, and the number of dimensions of the first color signal y that represents a known number is three. Thus, a known number is added to the unknown number so that both the number of dimensions of the unknown number and the number of dimensions of the known number are four. For example, if an unknown number is represented by $x = (x_1, x_2, \ldots, x_m)^T$ and a known number is represented by $y = (y_1, y_2, \ldots, y_n)^T$, where $m > n$, a known number is separately added to $(m-n)$ components out of the components of the unknown number. $x = (x_1, x_2, \ldots, x_n, X_{n+1}, \ldots, X_{m-1}, X_m)^T$ may be used, where $X_{n+1}, \ldots, X_{m-1},$ and $X_m$ are known numbers. In the specific example, for example, if the component K is fixed in $x = (C, M, Y, K)^T$, by way of example, values three dimensions, i.e., CMY, may be determined. Therefore, CMY may be determined from L*a*b* and K. Three-dimensional computation for determining CMY from L*a*b* with K fixed may be substantially performed.

The first calculation unit 1 calculates the sensitivity matrix $\partial f(x_k)$, and calculates $\Delta x_k = \partial f(x_k)^{-1} \Delta y_k$ using the inverse matrix of the sensitivity matrix to determine a successive solution $x_{k+1}$ using $x_{k+1} = x_k + \Delta x_k$. The sensitivity matrix $\partial f(X_k)$ will become 0 when a component given as a known number is differentiated, and is therefore an n×n-dimensional square matrix. In the specific example, the sensitivity matrix $\partial f(x_k)$ becomes a 3×3 matrix. Therefore, $$\Delta(C_k, M_k, Y_k)^T = \partial f(C_k, M_k, Y_k)^{-1} \Delta(L^*, a^*, b^*)^T$$

may be calculated to determine a successive solution using $$(C_{k+1}, M_{k+1}, Y_{k+1})^T = (C_k, M_k, Y_k)^T + \Delta(C_k, M_k, Y_k)^T.$$

In this case, K is determined in advance and is fixed.

The determination unit 2 determiners whether or not the obtained successive solution is divergent. The determination may be made from, for example, the values of a determinant of the sensitivity matrix $\partial f(x_k)$. In this case, it is determined whether or not the successive solution is within a preset range. Alternatively, the determination may be based on the successive solution. In this case, since the value of each component ranges from 0 to 100 when CMYK is expressed in dot percent, the range may be set or the upper limit of the range plus $\alpha$ and the lower limit of the range minus $\alpha$ may be set, where $\alpha$ may be set in accordance with accuracy.

If the determination unit 2 determines that the successive solution is not divergent, the first calculation unit 1 performs convergence determination. The determination may be made by, for example, determining whether or not the difference between the current $\Delta(C_k, M_k, Y_k)$ and the previous $\Delta(C_{k-1}, M_{k-1}, Y_{k-1})$ falls within a preset range. Alternatively, the determination may be made by calculating $L^*_{k+1}$, $a^*_{k+1}$, and $b^*_{k+1}$ from $C_{k+1}$, $M_{k+1}$, and $Y_{k+1}$ of the successive solution and from the fixed K using the input/output characteristic function and by determining whether or not the difference (for example, color difference) between $L^*_{k+1}$, $a^*_{k+1}$, and $b^*_{k+1}$ and given $(L^*, a^*, b^*)$ falls within a preset range. If convergence has occurred, $(C_{k+1}, M_{k+1}, Y_{k+1}, K)$ may be used as a solution. If convergence has not occurred, the computation may be repeatedly performed, starting from the calculation of sensitivity matrix $\partial f(x_{k+1})$, on the basis of the successive solution $(C_{k+1}, M_{k+1}, Y_{k+1})$.

If the determination unit 2 determines that the successive solution is divergent, the second calculation unit 3 calculates a second successive solution. The calculation may be performed by using the first example described above in which the successive solution that minimizes a linear equation which uses the sensitivity matrix is calculated, by using the second example described above in which the Levenberg-Marquardt method employing the identity matrix I and a regularization parameter is used, or by using any other appropriate method.

Here, a third example of the calculation method used by the second calculation unit 3 will be described. For example, if the first calculation unit 1 does not determine divergence in the k-th iteration of computation but determines in the (k+1)-th iteration of computation that the solution is divergent, in the related art, a component that exceeds a preset range among the components is forcibly set to a maximum value or a minimum value and the computation is repeatedly performed. Even if iteration of computation is performed using this related art method, a solution may not necessarily be determined because oscillation is not removed. That is, if the sensitivity matrix is irregular, the direction of divergence is no longer meaningful. The above method is equivalent to a method in which a component that exceeds a preset range is regarded as being divergent in the direction of the component and in which the divergence is to be removed by setting the component to a maximum value or a minimum value. However, since this operation does not remove the divergence, it is not reasonable to consider that divergence occurs in the direction of a successive solution vector that exceeds a preset range.

In the third example, the solution may probably be beyond the color gamut boundary in any direction when the solution is divergent. In the specific example, K in CMYK is fixed. Thus, the color gamut boundary for CMY with K fixed may be assumed. The color gamut boundary for CMY is assumed to be represented by, for example, the value of each component ranging from 0 to 100 when expressed in dot percent. In this case, the color gamut boundary is defined by C=0 or 100, M=0 or 100, and Y=0 or 100. Also in this case, a preset value β may be used, and C=−β or 100+β, m=−β or 100+β, and Y=−β or 100+β may be set. The minimization problem for these values is solved. In the following description, for the convenience of understanding, specific values are used, and the description will be given for β=5, where C=−5 or 105, M=−5 or 105, and Y=−5 or 105.

Applying the linear equations using the sensitivity matrices given in formula (1) to the specific example (CMYK and L*a*b*) discussed here yields:

$$\left. \begin{aligned} \Delta L^* &= \frac{\partial L^*}{\partial C}\Delta C + \frac{\partial L^*}{\partial M}\Delta M + \frac{\partial L^*}{\partial Y}\Delta Y \\ \Delta a^* &= \frac{\partial a^*}{\partial C}\Delta C + \frac{\partial a^*}{\partial M}\Delta M + \frac{\partial a^*}{\partial Y}\Delta Y \\ \Delta b^* &= \frac{\partial b^*}{\partial C}\Delta C + \frac{\partial b^*}{\partial M}\Delta M + \frac{\partial b^*}{\partial Y}\Delta Y \end{aligned} \right\} \quad (3)$$

For example, if a certain successive solution is CMY=(90, 80, 20), the update values (i.e., the differences from the color gamut boundary) for each color gamut boundary (here, C=−5 or 105, M=−5 or 105, Y=−5 or 105) are ΔC=15 or −95, ΔM=25 or −85, and ΔY=85 or −25. The above update values are used as the limit update values, and plural linear equations, the number of which is greater than the number of unknown numbers, are formed on the basis of the limit update values.

Following are linear equations in which each of ΔC=15 or −95, ΔM=25 or −85 and ΔY=85 or −25 is set to a fixed value:

$$\left. \begin{aligned} \Delta L^* &= \frac{\partial L^*}{\partial C}\times 15 + \frac{\partial L^*}{\partial M}\Delta M + \frac{\partial L^*}{\partial Y}\Delta Y \\ \Delta a^* &= \frac{\partial a^*}{\partial C}\times 15 + \frac{\partial a^*}{\partial M}\Delta M + \frac{\partial a^*}{\partial Y}\Delta Y \\ \Delta b^* &= \frac{\partial b^*}{\partial C}\times 15 + \frac{\partial b^*}{\partial M}\Delta M + \frac{\partial b^*}{\partial Y}\Delta Y \end{aligned} \right\} \text{linear equation (1)} \quad (4)$$

$$\left. \begin{aligned} \Delta L^* &= \frac{\partial L^*}{\partial C}\times (-95) + \frac{\partial L^*}{\partial M}\Delta M + \frac{\partial L^*}{\partial Y}\Delta Y \\ \Delta a^* &= \frac{\partial a^*}{\partial C}\times (-95) + \frac{\partial a^*}{\partial M}\Delta M + \frac{\partial a^*}{\partial Y}\Delta Y \\ \Delta b^* &= \frac{\partial b^*}{\partial C}\times (-95) + \frac{\partial b^*}{\partial M}\Delta M + \frac{\partial b^*}{\partial Y}\Delta Y \end{aligned} \right\} \text{linear equation (2)}$$

$$\left. \begin{aligned} \Delta L^* &= \frac{\partial L^*}{\partial C}\Delta C + \frac{\partial L^*}{\partial M}\times 25 + \frac{\partial L^*}{\partial Y}\Delta Y \\ \Delta a^* &= \frac{\partial a^*}{\partial C}\Delta C + \frac{\partial a^*}{\partial M}\times 25 + \frac{\partial a^*}{\partial Y}\Delta Y \\ \Delta b^* &= \frac{\partial b^*}{\partial C}\Delta C + \frac{\partial b^*}{\partial M}\times 25 + \frac{\partial b^*}{\partial Y}\Delta Y \end{aligned} \right\} \text{linear equation (3)}$$

$$\left. \begin{aligned} \Delta L^* &= \frac{\partial L^*}{\partial C}\Delta C + \frac{\partial L^*}{\partial M}\times (-85) + \frac{\partial L^*}{\partial Y}\Delta Y \\ \Delta a^* &= \frac{\partial a^*}{\partial C}\Delta C + \frac{\partial a^*}{\partial M}\times (-85) + \frac{\partial a^*}{\partial Y}\Delta Y \\ \Delta b^* &= \frac{\partial b^*}{\partial C}\Delta C + \frac{\partial b^*}{\partial M}\times (-85) + \frac{\partial b^*}{\partial Y}\Delta Y \end{aligned} \right\} \text{linear equation (4)}$$

$$\left. \begin{aligned} \Delta L^* &= \frac{\partial L^*}{\partial C}\Delta C + \frac{\partial L^*}{\partial M}\Delta M + \frac{\partial L^*}{\partial Y}\times 85 \\ \Delta a^* &= \frac{\partial a^*}{\partial C}\Delta C + \frac{\partial a^*}{\partial M}\Delta M + \frac{\partial a^*}{\partial Y}\times 85 \\ \Delta b^* &= \frac{\partial b^*}{\partial C}\Delta C + \frac{\partial b^*}{\partial M}\Delta M + \frac{\partial b^*}{\partial Y}\times 85 \end{aligned} \right\} \text{linear equation (5)}$$

$$\left. \begin{aligned} \Delta L^* &= \frac{\partial L^*}{\partial C}\Delta C + \frac{\partial L^*}{\partial M}\Delta M + \frac{\partial L^*}{\partial Y}\times (-25) \\ \Delta a^* &= \frac{\partial a^*}{\partial C}\Delta C + \frac{\partial a^*}{\partial M}\Delta M + \frac{\partial a^*}{\partial Y}\times (-25) \\ \Delta b^* &= \frac{\partial b^*}{\partial C}\Delta C + \frac{\partial b^*}{\partial M}\Delta M + \frac{\partial b^*}{\partial Y}\times (-25) \end{aligned} \right\} \text{linear equation (6)}$$

In the above linear equations, two of ΔC, ΔM, and ΔY are unknown numbers, and the number of equations is larger than the number of unknown numbers, resulting in a stable solution being calculated. In addition, divergence occurs near the color gamut boundary that is the boundary where actual data exists, and therefore the optimum solution is close to a solution calculated using any one of the above linear equations. Because of the color gamut boundary being closed, the occurrence of divergence may be avoided by a solution calculated using any one of the linear equations regardless of the direction of divergence.

The above linear equations may be solved by determining a solution that numerically and analytically minimizes $\Delta C$, $\Delta M$, and $\Delta Y$ using the cost function given in formula (2). A number of sets of solutions for $\Delta C$, $\Delta M$, and $\Delta Y$ equal to the number of sets of linear equations are calculated, and the (k+1)-th successive solutions $(C_{k+1}, M_{k+1}, Y_{k+1})$ are obtained from the k-th successive solution $(C_k, M_k, Y_k)$, respectively. $L^*a^*b^*$ is calculated from the above successive solutions and the fixed K by using the input/output characteristic function of the output device. Among the sets of linear equations, the set of linear equations that is the closest to the given $L^*a^*b^*$ is determined, and a successive solution is determined from solutions obtained from the determined linear equations to update the successive solution of the first calculation unit 1.

Figure 4:
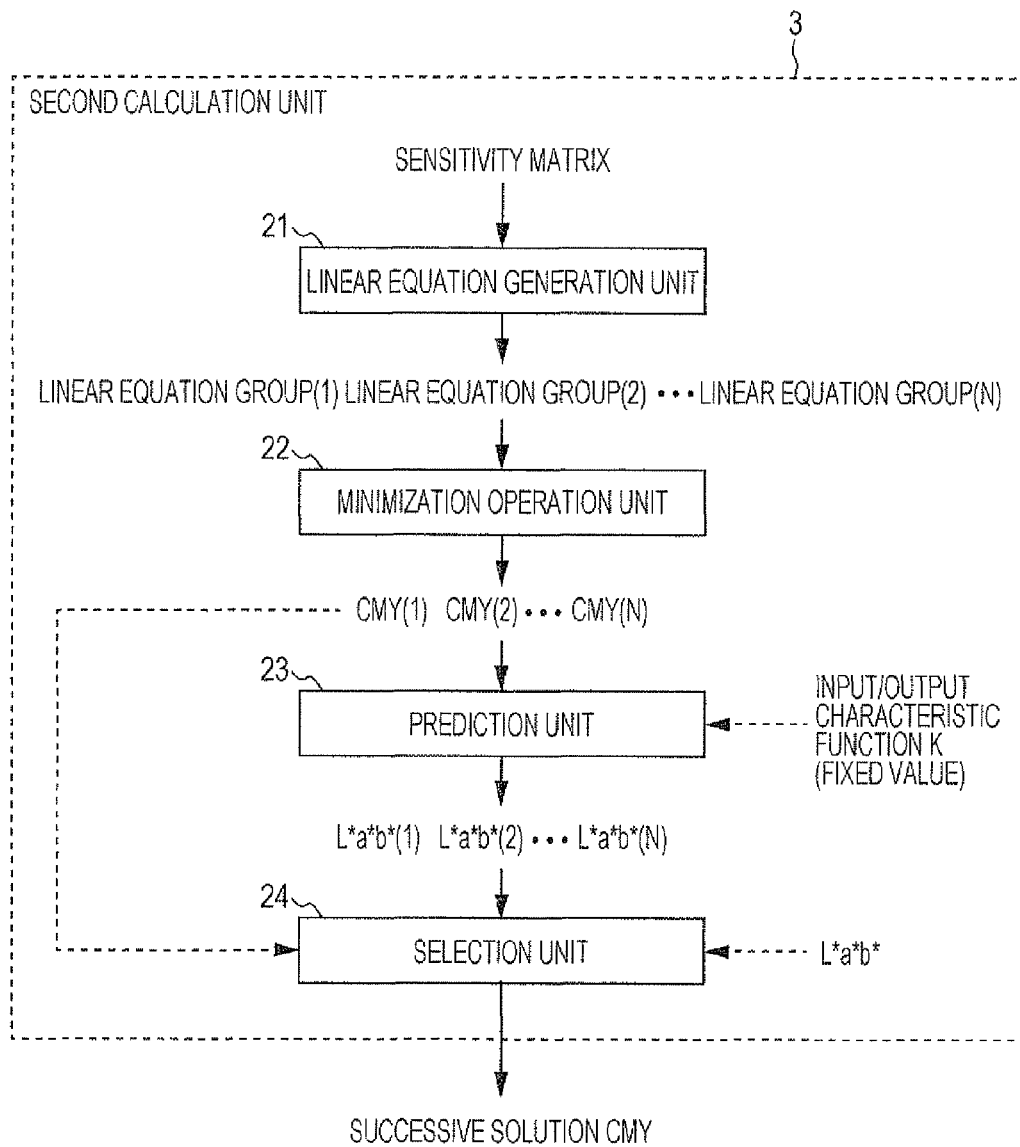
FIG. 4 is a schematic diagram illustrating an example of a second calculation unit.

FIG. 4 illustrates an example configuration of the second calculation unit 3 in the third example described above. In FIG. 4, the second calculation unit 3 includes a linear equation generation unit 21, a minimization operation unit 22, a prediction unit 23, and a selection unit 24.

The linear equation generation unit 21 generates plural linear equations with changing unknown numbers to be fixed. In each of the linear equations, at least one of unknown numbers in linear equations using sensitivity matrices is set to a fixed value. A value to which an unknown number is fixed may be set so that a color signal representing the boundary of the color gamut reproduced by the output device may be obtained. In the specific example described above, six linear equations in which the C, M, and Y values are fixed to the upper limit or lower limit are generated for the linear equations given in formula (3). In the example described above, values of $\pm\alpha$ with respect to the color gamut boundary are set as fixed values. It is to be understood that values to be fixed for the respective components are not limited to those in the specific example described above.

The minimization operation unit 22 determines a solution that minimizes each linear equation. Since a solution is determined for each linear equation, in the specific example described above, a solution is determined from each of the six linear equations given in formula (4).

The prediction unit 23 predicts a color signal corresponding to each of the solutions using the input/output characteristic function, on the basis of the solutions determined by the minimization operation unit 22. In the specific example described above, $L^*a^*b^*$ is predicted from the solutions for CMY and the K given as a fixed value using the input/output characteristic function.

The selection unit 24 selects linear equations that minimize the difference between the color signals predicted by the prediction unit 23 and the given first color signals ($L^*a^*b^*$), and determines a successive solution from the solutions obtained from the linear equations.

With the above configuration, the above method allows a successive solution to be obtained without being divergent even if a successive solution obtained using the inverse matrix of the sensitivity matrix is divergent. The obtained successive solution is substituted for the successive solution of the first calculation unit 1, and convergence determination is performed. If convergence has not occurred, iterative processing is performed.

In the specific example described above, a description has been given of a case where a color signal based on the CMYK representation are given to an output device and the colors output from the output device are measured to obtain a color signal based on the $L^*a^*b^*$ representation. It is to be understood that the respective color signals as above are merely examples, and, for example, color signals given to the output device may be based on various representations such as CMY, CMYKOV in which orange (O) and violet (V) are added to CMYK, CMYKRGB in which red (R), green (G), and blue (B) are added to CMYK, and ROB. Color signals obtained from the colors output from the output device are not limited to those based on the $L^*a^*b^*$ representation, but may be based on various representations such as LUV, LCH, YCrCb, and XYZ.

The foregoing description has been given of Newton's method as a calculation method used by the first calculation unit 1, by way of example. The calculation method used by the first calculation unit 1 is not limited to Newton's method, but may be any of various methods using the inverse matrix of the sensitivity matrix. For example, regression model based methods disclosed in Japanese Unexamined Patent Application Publication No. 10-262157 and Japanese Unexamined Patent Application Publication No. 2002-84434 involve iterative computation as follows: Weighted regression analysis is performed with weight applied to actual data in accordance with the given $L^*a^*b^*$ and the distance from K, and a sensitivity matrix (regression coefficient) is calculated. Then, the weight is updated to update the solution.

In this case, the input/output characteristic function of the output device is represented by $$\left.\begin{array}{l} L^* = s_{11}C + s_{12}M + s_{13}Y + s_{14}K + s_{15} \\ a^* = s_{21}C + s_{22}M + s_{23}Y + s_{24}K + s_{25} \\ b^* = s_{31}C + s_{32}M + s_{33}Y + s_{34}K + s_{35} \end{array}\right\}$$

if CMYK, which is used in the specific example described above, is given to the output device and $L^*a^*b^*$ is obtained by measuring the output colors. CMY is determined from $L^*a^*b^*$ and K with the K fixed. In this case, CMY is given by $$\begin{pmatrix} C \\ M \\ Y \end{pmatrix} = \begin{pmatrix} s_{11} & s_{12} & s_{13} \\ s_{21} & s_{22} & s_{23} \\ s_{31} & s_{32} & s_{33} \end{pmatrix}^{-1} \begin{pmatrix} L^* - s_{14}K - s_{15} \\ a^* - s_{24}K - s_{25} \\ b^* - s_{34}K - s_{35} \end{pmatrix}.$$

Here, if $$\begin{pmatrix} s_{11} & s_{12} & s_{13} \\ s_{21} & s_{22} & s_{23} \\ s_{31} & s_{32} & s_{33} \end{pmatrix}$$

is irregular, a solution may be divergent. Therefore, the determination unit 2 determines whether or not a solution is divergent. If it is determined that a solution is divergent, the second calculation unit 3 may determine a second successive solution using a method that does not cause divergence.

The calculation method used by the second calculation unit 3 may be one of the first, second, and third examples described above or any other method. For example, if the third example is used, plural sets of linear equations in which one of unknown numbers is fixed may be generated using the upper limit and lower limit as they are which are set for each component in advance, and minimization problems may be solved. Following are linear equation groups in which each component has an upper limit of 105 and a lower limit of −5 as a specific example:

$$\left.\begin{array}{l} L^* = s_{11} \times 105 + s_{12}M + s_{13}Y + s_{14}K + s_{15} \\ a^* = s_{21} \times 105 + s_{22}M + s_{23}Y + s_{24}K + s_{25} \\ b^* = s_{31} \times 105 + s_{32}M + s_{33}Y + s_{34}K + s_{35} \end{array}\right\} \text{linear equation (1)}$$

$$\left.\begin{array}{l} L^* = s_{11} \times (-5) + s_{12}M + s_{13}Y + s_{14}K + s_{15} \\ a^* = s_{21} \times (-5) + s_{22}M + s_{23}Y + s_{24}K + s_{25} \\ b^* = s_{31} \times (-5) + s_{32}M + s_{33}Y + s_{34}K + s_{35} \end{array}\right\} \text{linear equation (2)}$$

$$\left.\begin{array}{l} L^* = s_{11}C + s_{12} \times 105 + s_{13}Y + s_{14}K + s_{15} \\ a^* = s_{21}C + s_{22} \times 105 + s_{23}Y + s_{24}K + s_{25} \\ b^* = s_{31}C + s_{32} \times 105 + s_{33}Y + s_{34}K + s_{35} \end{array}\right\} \text{linear equation (3)}$$

$$\left.\begin{array}{l} L^* = s_{11}C + s_{12} \times (-5) + s_{13}Y + s_{14}K + s_{15} \\ a^* = s_{21}C + s_{22} \times (-5) + s_{23}Y + s_{24}K + s_{25} \\ b^* = s_{31}C + s_{32} \times (-5) + s_{33}Y + s_{34}K + s_{35} \end{array}\right\} \text{linear equation (4)}$$

$$\left.\begin{array}{l} L^* = s_{11}C + s_{12}M + s_{13} \times 105 + s_{14}K + s_{15} \\ a^* = s_{21}C + s_{22}M + s_{23} \times 105 + s_{24}K + s_{25} \\ b^* = s_{31}C + s_{32}M + s_{33} \times 105 + s_{34}K + s_{35} \end{array}\right\} \text{linear equation (5)}$$

$$\left.\begin{array}{l} L^* = s_{11}C + s_{12}M + s_{13} \times (-5) + s_{14}K + s_{15} \\ a^* = s_{21}C + s_{22}M + s_{23} \times (-5) + s_{24}K + s_{25} \\ b^* = s_{31}C + s_{32}M + s_{33} \times (-5) + s_{34}K + s_{35} \end{array}\right\} \text{linear equation (6)}$$

Normal equations for C, M, and Y are solved for each of the above linear equations by using numerical analysis. The linear equations may be solved by regarding Δy given in formula (1) as y (y becomes L*a*b*) and Δx given in formula (1) as x (x becomes CMYK) and applying Δy and Δx to the minimization problem given in formula (2). Accordingly, a number of solutions for CMY equal to the number of linear equations may be calculated. L*a*b* values may be calculated from the respective calculated CMY solutions (and from the known K) using the input/output characteristic function of the output device. Among the calculated L*a*b* values, the solutions for the linear equations from which the L*a*b* values closes to the given L*a*b* values may be selected, and the approximate solutions may be determined. Then, the approximate solutions may be substituted for the approximate solutions determined to be divergent, and convergence determination may be performed. If convergence has not occurred, weight may be applied to the actual data from the approximate solutions and further iterative processing may be performed.

Figure 5:
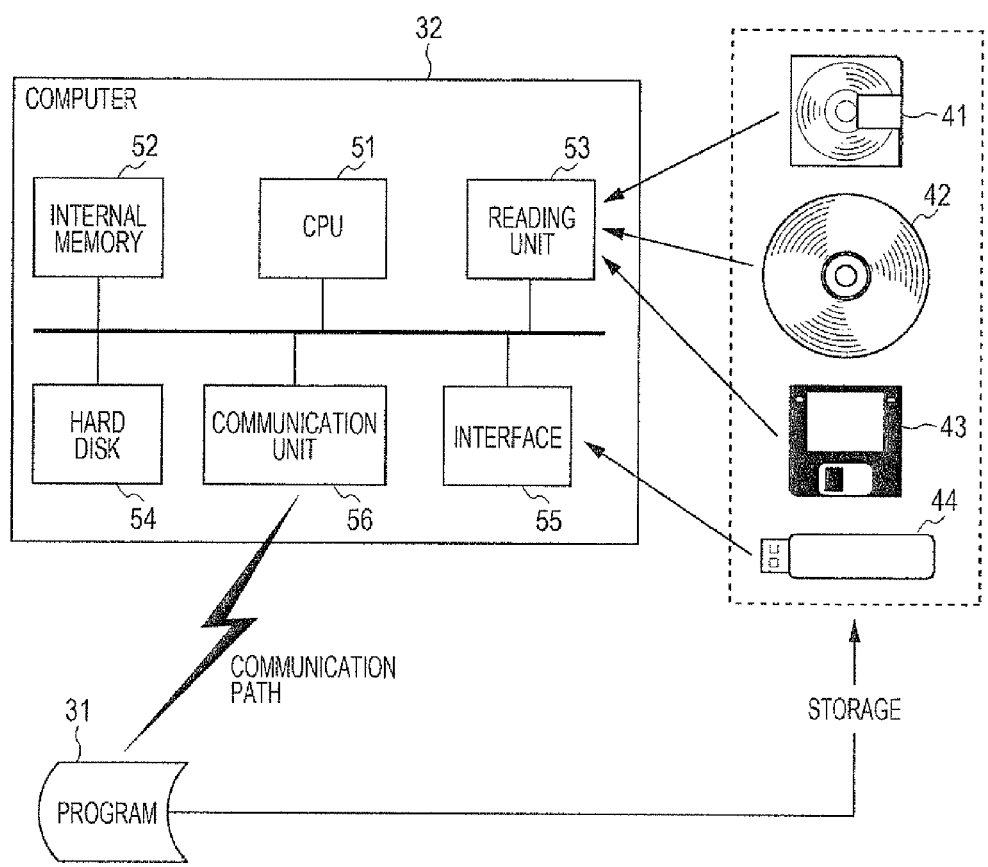
FIG. 5 illustrates an example of a computer program, a storage medium storing the computer program, and a computer when functions described in the exemplary embodiment of the present invention are implemented by the computer program.

FIG. 5 illustrates an example of a computer program, a storage medium storing the computer program, and a computer when the functions described in an exemplary embodiment of the present invention are implemented by the computer program.

All or some of the functions of the respective units described above in the exemplary embodiment of the present invention may be implemented by a program 31 executed by a computer 32. In this case, the program 31, data used in the program 31, and the like may be stored in a non-transitory storage medium read by the computer 32. The term "storage medium", as used herein, means a medium in which changes in energy such as magnetic energy, optical energy, or electric energy are induced in accordance with the content of the program 31 and the content of the program 31 is transmitted to a reading unit 53 provided in a hardware resource of the computer 32 in the form of corresponding signals. Examples of the storage medium include a magneto-optical disk 41, an optical disk 42 (including a compact disc (CD) and a digital versatile disc (DVD)), a magnetic disk 43, and a memory 44 (including an integrated circuit (IC) card, a memory card, and a flash memory). The above storage media may not necessarily be portable.

The program 31 is stored in the above storage media, and the storage media are placed in, for example, the reading unit 53 or an interface 55 of the computer 32 so that the program 31 is read on the computer 32. The read program 31 is stored in an internal memory 52 or a hard disk 54 (including a magnetic disk and a silicon disk), and a central processing unit (CPU) 51 executes the program 31, thereby implementing all or some of the functions described above in the exemplary embodiment of the present invention. Alternatively, the program 31 may be transferred to the computer 32 via a communication path. In the computer 32, the program 31 may be received at a communication unit 56 and may be stored in the internal memory 52 or the hard disk 54, and the CPU 51 may execute the program 31, thereby implementing all or some of the functions described above in the exemplary embodiment of the present invention.

The computer 32 may be connected to various devices via the interface 55. Some portions of the computer 32 may be configured by hardware or all the portions may be configured by hardware. Alternatively, the computer 32 may be configured by a program including all or some of the functions described in the exemplary embodiment of the present invention together with other configuration. When the computer 32 is used for other application, the program may be integrated with a program used for the application.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
   a first calculation unit that calculates a second color signal from a first color signal by using successive approximation, the first color signal being given by repeatedly calculating a first successive solution using an inverse matrix of a sensitivity matrix of an input/output characteristic function of an output device;
   a determination unit that determines whether or not the first successive solution calculated by the first calculation unit is divergent; and
   a second calculation unit that calculates a second successive solution using a method different from a method used by the first calculation unit when the determination unit determines that the first successive solution is divergent, the second calculation unit including
   (i) a linear equation generation unit that generates a plurality of linear equations with changing unknown numbers to be fixed, each of the plurality of linear equations being a linear equation in which an unknown number in a linear equation using the sensitivity matrix is set to a fixed value, the linear equation generation unit fixing the unknown number so that a color signal representing a boundary of a color gamut reproduced by the output device is obtained, (ii) a minimization operation unit that determines a solution that minimizes each of the linear equations, (iii) a prediction unit that predicts a color signal corresponding to each solution using the input/output characteristic function on the basis of the solutions that minimize the linear equations, and (iv) a selection unit that selects a linear equation that minimizes a difference between the predicted color signal and the first color signal, and that uses the solution obtained by the selected linear equation as the second successive solution.

2. The color processing apparatus according to claim 1, wherein the second calculation unit calculates the second successive solution that minimizes a linear equation which uses the sensitivity matrix.

3. The color processing apparatus according to claim 1, wherein the second calculation unit calculates the second successive solution using the sensitivity matrix and an inverse matrix of a matrix which uses a regularization factor.

4. The color processing apparatus according to claim 1, wherein the determination unit determines whether the first successive solution is divergent by using a determinant of the sensitivity matrix or by using a difference between the first successive solution and a color signal representing a boundary of a color gamut reproduced by the output device.

5. A color processing method comprising:

performing a first calculation process by calculating a second color signal from a first color signal by using successive approximation, the first color signal being given by repeatedly calculating a first successive solution using an inverse matrix of a sensitivity matrix of an input/output characteristic function of an output device;

determining whether or not the first successive solution calculated in the first calculation process is divergent; and performing a second calculation process by calculating a second successive solution using a method different from a method used in the first calculation process when it is determined in the determining that the first successive solution is divergent, the second calculation process including (i) generating a plurality of linear equations with changing unknown numbers to be fixed, each of the plurality of linear equations being a linear equation in which an unknown number in a linear equation using the sensitivity matrix is set to a fixed value, (ii) fixing the unknown number so that a color signal representing a boundary of a color gamut reproduced by the output device is obtained, (iii) determining a solution that minimizes each of the linear equations, (iv) predicting a color signal corresponding to each solution using the input/output characteristic function on the basis of the solutions that minimize the linear equations, and (v) selecting a linear equation that minimizes a difference between the predicted color signal and the first color signal, and that uses the solution obtained by the selected linear equation as the second successive solution.

6. A non-transitory computer readable medium storing a program causing a computer to execute a process for performing color processing, the process comprising:

performing a first calculation process by calculating a second color signal from a first color signal by using successive approximation, the first color signal being given by repeatedly calculating a first successive solution using an inverse matrix of a sensitivity matrix of an input/output characteristic function of an output device;

determining whether or not the first successive solution calculated in the first calculation process is divergent; and performing a second calculation process by calculating a second successive solution using a method different from a method used in the first calculation process when it is determined in the determining that the first successive solution is divergent, the second calculation process including (i) generating a plurality of linear equations with changing unknown numbers to be fixed, each of the plurality of linear equations being a linear equation in which an unknown number in a linear equation using the sensitivity matrix is set to a fixed value, (ii) fixing the unknown number so that a color signal representing a boundary of a color gamut reproduced by the output device is obtained, (iii) determining a solution that minimizes each of the linear equations, (iv) predicting a color signal corresponding to each solution using the input/output characteristic function on the basis of the solutions that minimize the linear equations, and (v) selecting a linear equation that minimizes a difference between the predicted color signal and the first color signal, and that uses the solution obtained by the selected linear equation as the second successive solution.

* * * * *